United States Patent [19]
Hart

[11] Patent Number: 5,514,721
[45] Date of Patent: May 7, 1996

[54] THERMOPLASTIC COMPOSITIONS HAVING ALTERED RECLAMINED RUBBER THEREIN AND METHOD FOR MAKING SAME

[75] Inventor: Eric R. Hart, Woodburn, Ky.

[73] Assignee: Laser Supply, Inc., Edgemont, Pa.

[21] Appl. No.: 336,508

[22] Filed: Nov. 9, 1994

[51] Int. Cl.$^6$ .................... C08J 11/04; C08L 9/06
[52] U.S. Cl. .................... 521/41; 521/44; 525/99; 525/232; 525/236; 525/237
[58] Field of Search ............ 525/99, 236, 237, 525/232; 521/41, 44

[56] References Cited

U.S. PATENT DOCUMENTS

| | | | |
|---|---|---|---|
| 4,098,737 | 7/1978 | Lee et al. .................... | 521/44 |
| 4,130,535 | 12/1978 | Coran et al. .................... | 525/232 |
| 4,386,182 | 5/1983 | Zijp .................... | 521/44 |
| 5,157,082 | 10/1992 | Johnson .................... | 525/237 |

*Primary Examiner*—Paul R. Michl
*Assistant Examiner*—Alga Asinovsky
*Attorney, Agent, or Firm*—Juettner Pyle Lloyd & Piontek

[57] ABSTRACT

A composition containing reclaimed vulcanized rubber particles and capable of being recycled by melting is disclosed. A thermoplastic substrate is first melted, and an acid or base deflocculant and emulsifier for the rubber particles is added and mixed. The rubber particles are then added and heated with the substrate under high shear forces to redo the size of the particles, cause them to swell, and to emulsify the surface. The acid or base deflocculant is then neutralized to its isoelectric point, with the surfaces of the altered rubber particles in phase with the thermoplastic substrate.

12 Claims, No Drawings

THERMOPLASTIC COMPOSITIONS HAVING ALTERED RECLAMINED RUBBER THEREIN AND METHOD FOR MAKING SAME

BACKGROUND OF THE INVENTION

This invention relates to the reprocessing of reclaimed vulcanized rubber into a thermoplastic substrate.

Notwithstanding the tremendous amount of waste and scrap vulcanized rubber, such as tires, flashings and trimmings, no acceptable proposal has been advanced to convert such waste products into renewed products which are of a high quality and are reusable or reprocessable. It is known to use ground rubber as a filler in an elastomeric thermoset, but the product has only one useful life and are not easily recycled. Thermosets have an additional disadvantage of requiring a curing cycle in a heated mold, although the articles produced are generally less expensive than comparable thermoplastic articles.

It is also known to incorporate reclaimed rubber buffings or particles as fillers into thermoplastic resins and rubbers. Thermoplastics have the advantage that they can be reclaimed by remelting and are easier to process into a final form. Addition of reclaimed rubber in particulate form at reasonably high levels, however, causes undesirable loss of properties in the article, since the rubber particles are usually not compatible with the thermoplastic phase, either because the particle size is too large, or the particles do not bind well in the system. Finer rubber grinds can be employed, but only at a significant increase in cost.

Summary of the Invention

The present invention involves the incorporation of reclaimed vulcanized rubber particles into a thermoplastic resin or rubber. The thermoplastic phase contains an acid or base deflocculant, an optional dispersant or surface active agent, and an emulsifier for the vulcanized rubber particles. After heating and mixing to provide a uniform mass, recycled rubber particles are added, and the mixture is subjected to heat and high shear forces. During such processing, the size of the rubber particles is reduced and the surfaces of the particles become emulsified and swelled in large colloidal form with a cationic or anionic surface charge, allowing for better dispersion and integration into the thermoplastic phase. Additional agents may be added to improve compatability, depending on the starting materials. Upon neutralization of the acid or base component to the isoelectric point, the material may be processed and reprocessed as a conventional thermoplastic rubber or other thermoplastic composite having superior physical properties and performance. The material, for example, can be compounded with up to fifty percent reclaimed rubber and have properties equivalent to vulcanized rubber.

The base thermoplastic substrate can be a styrene block copolymer containing the emulsifier and dispersant for the vulcanized rubber particles, and the emulsifier is preferably a styrene acrylic resin. The base substrate may also contain a minor amount of uncured virgin rubber. Various processing aids, plasticizers and antioxidants may be included. Near the end of the processing, a compatibilizer such as a selected block copolymer, different from the base polymer, may be employed to better physically link various components in the system.

Alternatively, the thermoplastic substrate may comprise an internally plasticized polyolefin along with an emulsifier and dispersant for the rubber particles, with the emulsifier preferably being a polyolefin resin. The substrate may also contain a small amount of uncured virgin rubber. The same process and processing aids are employed, with the acid or base deflocculant being finally neutralized to the isoelectric point. When a polyolefin substrate is employed, the various components are preferably linked physically together by use of slight cures of peroxide, silane or phenolic methylol resin with a chlorinated coagent.

Since the particle size of the vulcanized rubber particles are physically and chemically reduced during processing, the use of relatively expensive fine grinds is avoided. The process not only reduces the initial size of the rubber particles, the surfaces of the particles are altered so that the final product is in the form of a solid-solid suspension or colloid, with the rubber particles as the dispersed phase, and at least the emulsified surfaces of the rubber particles in phase with the thermoplastic substrate.

DESCRIPTION OF THE PREFERRED EMBODIMENTS

The process of the present invention comprises a number of steps carried out in sequence in conventional rubber processing equipment using heat and high shear forces, such as a mill, a Banbury, or a continuous mixer. First, a thermoplastic polymer or mixture of polymers are introduced and melted. Second, an emulsifier and deflocculant for the vulcanized rubber particles are added and mixed with the thermoplastic, together with optional dispersants. Then, ground reclaimed vulcanized rubber particles are added and processed sufficiently to break down the particles into a smaller size and cause them to swell with emulsified surfaces. Finally, the mixture is neutralized to its isoelectric point, and additives may be employed, if required, to improve bonding between the various components. The mixture is processed until it is homogeneous and there are no separate phases when viewed under a microscope. The mixture is then cooled and may be cut into pieces for use a conventional thermoplastic resin or rubber.

The base thermoplastic polymer and polymers which are employed will be selected to suit the properties required in the final product, and a wide variety of substrates are available. The most preferred substrates are ones which have elastomeric properties to enable the compounding of products having properties comparable to vulcanized rubber. Thus, thermoplastic elastomers such as styrene block copolymers are preferred, such as styrene isoprene or styrene butadiene copolymers. Thermoplastic resins and other polymers may also be employed, either alone or in addition to the thermoplastic rubber. Examples include polystyrene, acrylics, polyolefins, acetals, polyamids, polycarbonate, acrylonitrile butadiene-styrene and the like. Generally, the thermoplastic substrate will comprise from about 1 and preferably from about 5 to about 70 percent of the final product.

Also, if elastomeric properties are desired in the final product, a minor amount of uncured virgin rubber may be added, together with a curing system, as will be later described in more detail.

The emulsifying agents and deflocculant are selected from those which are capable of acting on the vulcanized rubber particles. The emulsifier is preferably styrene acrylic resin. Petroleum and wood rosin resins may also be employed, as well as metallic soaps. The deflocculant is preferably a solid resin based material which significantly reduces or increases the zeta potential of the mixture. Acidifying agents are preferable and include high acid number polyolefins and acrylics. Boric acid may be employed to disperse fillers present in the rubber particles. Sufficient emulsifier and deflocculant are added to coat and act on the surfaces of the rubber particles. Preferably, a useful range of deflocculant per weight of rubber particles is from about 0.25 to about 10 percent, and the range of emulsifier is from about 0.25 to about 5 percent.

Suitable deflocculants or dispersants include colloidal kaolin, carboxylated oxidized polyethylene (Ceramer 1607), vulcanized vegetable oil (Fractice R-97), emulsified latex in polystyrene (SBR 1904), 2-amino-2-method-l-propanol (AMP), fumed alumina, and fumed silica.

At this same stage, antioxidants, heat protection agents and flow control agents may be added. Suitable heat protection agents include, for example, zinc oxide, benzohydrotoluene and zinc-n-butyldithiocarbomate. Flow control agents to determine final viscosity include vulcanized vegetable oil, fumed silica, fumed alumina, carbon black, precipitated silica, and high structured polyethylenes waxes. Polyethylene may be added as an external lubricant.

The rubber particles employed are preferably finer than 50 mesh and are available commercially from a number of sources. Preparation of reclaimed vulcanized or partially vulcanized rubber particles is described, for example, in U.S. Pat. No. 4,469,284 and U.S. Pat. No. 4,098,737. Some known methods are capable of producing particles finer than 150 mesh, but only at a significant increase in cost. In terms of the final product, the particles may comprise from about 5 to about 95 percent by weight and preferably in the range of 25 to 65 percent.

The chemical composition of the rubber particles is not critical as long as they are capable of being acted on by the emulsifier and dispersant. Most available scrap is in the form of natural or styrene butadiene rubbers, but others may be employed, such as ethylene propylene diene rubber, ethylene propylene rubber and polyethylene octene elastomer.

In order to prepare a compound having properties similar to a vulcanized rubber, the following are acceptable agents and procedures.

A thermoplastic rubber such as a styrene block copolymer is added to a heated Banbury along with a quantity of styrene. The amount of styrene may be varied to determine the final hardness of the composition. A low molecular weight styrene block copolymer may be added as a plasticizer. These ingredients are mixed until they are a uniform molten mixture.

In addition, the initial phase may contain a quantity of uncured virgin rubber. This rubber is dispersed in the system during processing and improves elasticity and memory to the final product. A cure system for the rubber component can be selected from one of the many which are available commercially. The curing agents act to cure the dispersed rubber but are also believed to cause cross linking between the rubber particles, dispersed rubber and other components.

The above components are added to the mixer and are melted or fluxed and completely mixed.

An emulsifier, antioxidant, heat protection agent, flow control agent and dispersant are then added. The emulsifier for styrene based elastomers is preferably styrene acrylic resin. Suitable antioxidants include A.O. 2246 and Wingstay L, which are hindered phenolic antioxidants. Suitable agents for heat protection are described earlier. The preferred flow control agent is vulcanized vegetable oil to control the viscosity of the product.

The buffings or rubber particles are then added, and mixing continues until no separation of phase can be detected by a microscope at a power of 120 to 450 magnification. At this stage, the particle size or diameter of the rubber will be micron to submicron, or an average of less than about 5 microns.

At this stage in the processing, compatibilizers may be employed to additionally wet out the surface of the buffings and to provide linking between disparate components. The cure, if any, will be set depending on the viscosity desired. The cures are preferably in the range of 3% down to 1%. The cure gives unexpected additional memory to the composition. The acid charge is neutralized with the desired base. At this point the batch starts to come together and starts to have reasonable green strength. External lubricants such as polyethylene high density can be added to provide ease of processing. At this point if the polyethylene does not mix efficiently, then two phase compatibilizers can be used such as Kraton G-1650. Succinic anhydride Kraton F-1901 or the phenolic SP-1055 can help bring together styrenic and polyolefinic phases. The mixer is run until the temperature is about 275 to about 385 degrees F. The batch is then cooled and removed from the mixer and pelletized for this mix design.

Suitable compatibilizers, optional semi-cures and grafts include the following:

Kraton G-165 1, a high molecular weight SEPS block copolymer used to compatibilize styrenic and polyolefinic compounds.

Kraton F-1901, a functional block copolymer with the reactive functional group of succinic anhydride used to compatibilize blends of polyolefinic, styrenic and highly polar polymers such as acrylic, nylon and nitriles.

SP-1055 and SP 1056, used to compatibilize and cure elastomers and thermoplastic rubbers.

SP-6201, used to compatibilize and cure thermoplastic resins and thermoplastic rubbers.

Cytec's Tri Allyl Cyanurate, used to compatibilize and cure through the available double Bonds.

Sulfur * EV cures, used to cure double bonds and the unsaturation of other components.

Kenamid W-20, an alkyd terminal amine, used to compatibilize and shift the zeta potential in a polymer blend to its isoelectric point.

Polyacrylamides, polyamines (various molecular weight), used to compatibilize different phases, flocculate carboxylic polymers and shift zeta potential.

Polyethylenimine, polyamine, used to neutralize and shift zeta potential for large polymeric molecules.

AMP, 2-Amino-2-methyl-1-propanol, used to flocculate and neutralize carboxylic polymers by shifting the zeta potential.

The shifting and the neutralizing of the zeta potential to the isoelectric point is extremely important in how the solid-solid colloid knits the compound back together. With the zeta potential shifting agents, each compound can be designed differently so that the developer can improve the finished properties of a given compound. Compounds can, therefore, be customized for the end use.

The vulcanized rubber phase should be neutralized of particle charges resulting in completely wetting out the surfaces of the ground rubber particles. The neutralizing of the charges and surface charges is revealed by the compound arriving at its isoelectric point. At this point, additional mixing may change the physical properties significantly, and records should be kept of the rubber breakdown time in the mixer so one can reproduce the results at a future time. In order to keep reproducibility consistent, the mix time is very important because there can be viscosity and durometer shifts. The other properties such as tensile and abrasion resistance may also be affected. The desired properties of the finished product may be set by the testing feedback. The finished product is neutrally charged with a high degree of stability with no sign of the previous mastication.

A wide variety of formulas are available, depending on the application and use of the final product. In general, formulations can be provided which contain, by weight, from about 5 to about 95 percent rubber particles, from about 1 to about 70 percent thermoplastic substrate, from about 1 to about 25 percent emulsifier and isoelectric neutralizer, up to 35 percent of a homogeneous thermoplastic polymer, up to 10 percent of a low molecular weight block copolymer or polyolefin elastomer up to 10 percent of an external lubricant, up to 5 percent of vulcanized vegetable oil, and less than 3 percent antioxident and cures.

The following are five examples of formulas for thermoplastic compositions which may be used in the soles of shoes.

EXAMPLE I

| (Parts by Weight) | 1 | 2 | 3 | 4 | 5 |
|---|---|---|---|---|---|
| Buffings (100 mesh) | 160 | 160 | 160 | 65 | 40 |
| Kraton D 1101 | 110 | 120 | 110 | 60 | |
| SBR 1904 | 20 | 20 | 20 | | |
| Polystyrene GP | 30 | 30 | 30 | 30 | |
| Shellflex Oil 371 | | | | | 2 |
| Clay Hydrosparse | | | | | 20 |
| Shellvis 40 W | 6 | 6 | 6 | 3 | |
| PE HD 20 MI* | 30 | 30 | 30 | 10 | 30 |
| Styrene Acrylic | 10 | 10 | 10 | 5 | 3 |
| A.O. | 2 | 2 | 2 | 2 | 2 |
| Wingstay L | 2 | 2 | 2 | 2 | |
| Kraton G-1651 | 4 | 4 | 4 | 60 | 60 |
| Phenolic SP-1055 | | | | 1 | |
| Phenolic SP-6201 | | | | 4 | |
| Ceramer 1608 | | | | | 3 |
| Factice R-97 | 10 | 10 | | | |
| SBR-1502 | 10 | | | | 10 |
| SBR-1904 | | | | 10 | |
| Natsyn 2200 | | | | 16 | |

| | #2 | #3 | #4 | #5 |
|---|---|---|---|---|
| Tensile | 1207 psi | 1839 psi | 1689 psi | 2200 psi |
| Elongation | 508% | 220% | 460% | 400% |
| Hardness (Shore A) | 75 | 77 | 66 | 65 |
| Abrasion (NBS) | 132 | 123 | 159 | 160 |
| Ross Flex | Zero | Zero | Not avail | Not avail |
| Tenacity | 613,156 | 404,580 | 776,940 | 880,000 |

The following is an example of a thermoplastic composition which may be used to make molded railway cushioning ties.

EXAMPLE II

| Tire buffings (100 mesh) | 180 | |
|---|---|---|
| Shellvis 40 W | 2 | (thermoplastic substrate) |
| Rubber Latex (weight of solids) | 18 | (deflocculant/dispersant) |
| Phenolic SP-1055 | .5 | (flocculant/semi-cure) |
| Homogeneous PE (MPE) | 2 | (compatibilizer/emulsifier) |

The following are examples of polyolefinic formulations.

EXAMPLE III

| (Parts by Weight) | 1 | 2 | 3 | 4 | Function |
|---|---|---|---|---|---|
| Buffings (100 mesh) | 300 | 300 | 300 | 300 | |
| Chlorinated tire buffings (80 mesh) | | | | 300 | |
| Varimer Metalline | 200 | 200 | 200 | 200 | Emulsifier and Base substrate |
| Polyethylene Resin (Dow Chemical's Engage) | | | | | |
| POE Rubber (Dow Chemical's Affinity) | 50 | 50 | 50 | 50 | Base substrate |
| Polyethylene HD 20 MI | 50 | 50 | 50 | 50 | Lubricant |
| EPDM Rubber | 25 | 25 | 25 | 25 | Plasticizer |
| Acid Wax AC-392 (Allied Signal) | 20 | 20 | 20 | 20 | Deflocculant |
| Clay Hydrosperse | 100 | 100 | 100 | 100 | Dispersant |
| Base Wax (Petrolite's Unilin 700) | 10 | 10 | 10 | 10 | Flocculant |
| Dicumyl Peroxide | | 2 | | | Semicure |
| Flowers of Sulfur (Coagent) | | .5 | | | Semicure |
| SP1055 | | | 2 | 2 | Semicure |
| Chloro-sulfinated Polyethylene (DuPont's Hypalon 40) | | | 1 | | Coagent for SP-1055 |

The product of the present invention can be processed and reprocessed as a conventional reinforced thermoplastic material and may be formed into any desired shape by heating and cooling. Thus, the composition may be calendered into sheets, molded by various methods, and extruded. The thermoplastic compositions can be formulated to have properties comparable to, or better than vulcanized rubbers and have excellent chemical and weathering resistance.

I claim:

1. Method for making a reprocessable thermoplastic composition containing a thermoplastic material and vulcanized rubber particles, said method comprising the steps of first melting a thermoplastic material to form a heated mass, adding to said heated mass a deflocculant and an emulsifier for vulcanized rubber particles, said deflocculant being selected from the group consisting of organic and inorganic acid and base deflocculants, adding vulcanized rubber particles to said mass, heating and mixing of the resultant mass under high shear forces sufficiently to reduce the particles size to the rubber particles while emulsifying and swelling the surfaces of the same, neutralizing the mixture to its isoelectric point, and cooling and recovering the resultant mass.

2. The method of claim 1 wherein the step of melting a thermoplastic material comprises the additional step of adding a minor quantity of uncured virgin rubber.

3. The method of claim 1 wherein said thermoplastic material is thermoplastic rubber.

4. The method of claim 3 wherein said thermoplastic rubber is a styrene block copolymer.

5. The method of claim 3 wherein said thermoplastic rubber is an internally plasticized polyolefin.

6. The method of claim 1 wherein said thermoplastic material is a thermoplastic resin.

7. The method of claim 1 wherein said deflocculant is an acid dispersant.

8. The method of claim 4 wherein said emulsifier is a styrene acrylic polymer.

9. The method of claim 1 wherein said rubber particles comprise from about 5 to about 95 percent by weight of the composition and the thermoplastic material comprise from about one to about 70 percent by weight of the composition.

10. The method of claim 1 wherein the deflocculant is added as a level of about from 0.25 to about 10 percent based on the weight of the rubber particles.

11. The method of claim 1 wherein the emulsifier is added at a level of from about 0.25 to about 5 percent based on the weight of the rubber particles.

12. The method of claim 1 wherein the mass is heated to a temperature of from about 275 to about 385 degrees F.

* * * * *